United States Patent [19]
Fleck et al.

[11] Patent Number: 6,085,315
[45] Date of Patent: *Jul. 4, 2000

[54] DATA PROCESSING DEVICE WITH LOOP PIPELINE

[75] Inventors: Rod G. Fleck, Mountain View; Venkat Mattela, San Jose; Eric Chesters, Mountain View; Muhammad Afsar, San Jose, all of Calif.

[73] Assignee: Siemens Aktiengesellschaft, Munich, Germany

[*] Notice: This patent issued on a continued prosecution application filed under 37 CFR 1.53(d), and is subject to the twenty year patent term provisions of 35 U.S.C. 154(a)(2).

[21] Appl. No.: 08/928,444

[22] Filed: Sep. 12, 1997

[51] Int. Cl.$^7$ ..................................................... G06F 9/45
[52] U.S. Cl. ......................... 712/241; 712/205; 712/237; 712/239
[58] Field of Search ................. 395/800.24, 800.16, 395/709, 588; 712/1, 9, 23, 24, 32, 205, 207, 209, 215, 233, 235, 237, 241, 239

[56] References Cited

U.S. PATENT DOCUMENTS

| | | | |
|---|---|---|---|
| 3,593,306 | 7/1971 | Toy | 395/588 |
| 4,566,063 | 1/1986 | Zolnowsky et al. | 359/588 |
| 4,626,988 | 12/1986 | George | 395/588 |
| 4,792,892 | 12/1988 | Mary et al. | 395/588 |
| 5,131,086 | 7/1992 | Circello et al. | 395/389 |
| 5,303,357 | 4/1994 | Inoue et al. | 395/375 |
| 5,317,743 | 5/1994 | Imai et al. | 395/706 |
| 5,485,629 | 1/1996 | Dulong | 395/800.24 |
| 5,511,178 | 4/1996 | Takeda et al. | 711/125 |
| 5,809,308 | 9/1998 | Tirumalai | 395/709 |
| 5,850,551 | 12/1998 | Takayama et al. | 395/908 |
| 5,898,882 | 4/1999 | Kahle et al. | 712/23 |

FOREIGN PATENT DOCUMENTS 0 623 874 A1 11/1994 European Pat. Off. .
0 742 518 A2 11/1996 European Pat. Off. .

OTHER PUBLICATIONS

Johnson, Mike, "Superscalar Microprocessor Design", Advanced Micro Devices, PTR Prentice Hall, 1991, pp. 44–47.

Wedig and Rose "The Reduction of Branch Instruction Execution Overhead Using Structured Control Flow," Department of Electrical and Computer Engineering, pp. 119–125.

"Branch Buffering," IBM Technical Disclosure Bulletin, vol. 36, No. 5, May 1993, pp. 129–131.

*Primary Examiner*—Richard L Ellis
*Assistant Examiner*—Dzung Nguyen

[57] ABSTRACT

The data processing device according to the invention comprises an instruction providing unit having an input and an output, a pipeline unit for processing data having input and output stages, a loop pipeline unit for processing a loop instruction having input and output stages, said input stages of said pipeline units being coupled to said output of said instruction providing unit, said instruction providing unit providing data for said pipelines, and said pipeline units processing said data independently.

23 Claims, 4 Drawing Sheets

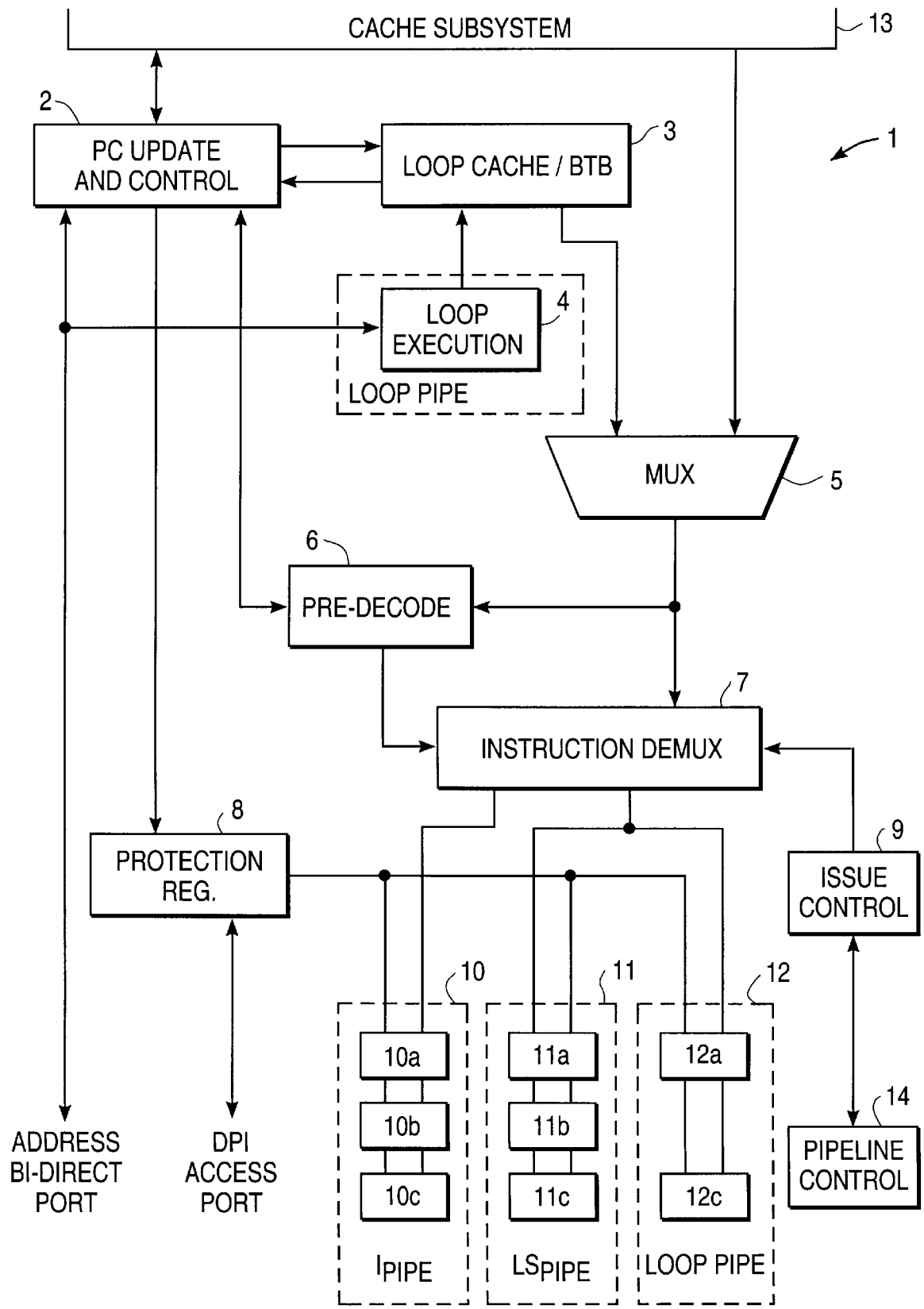

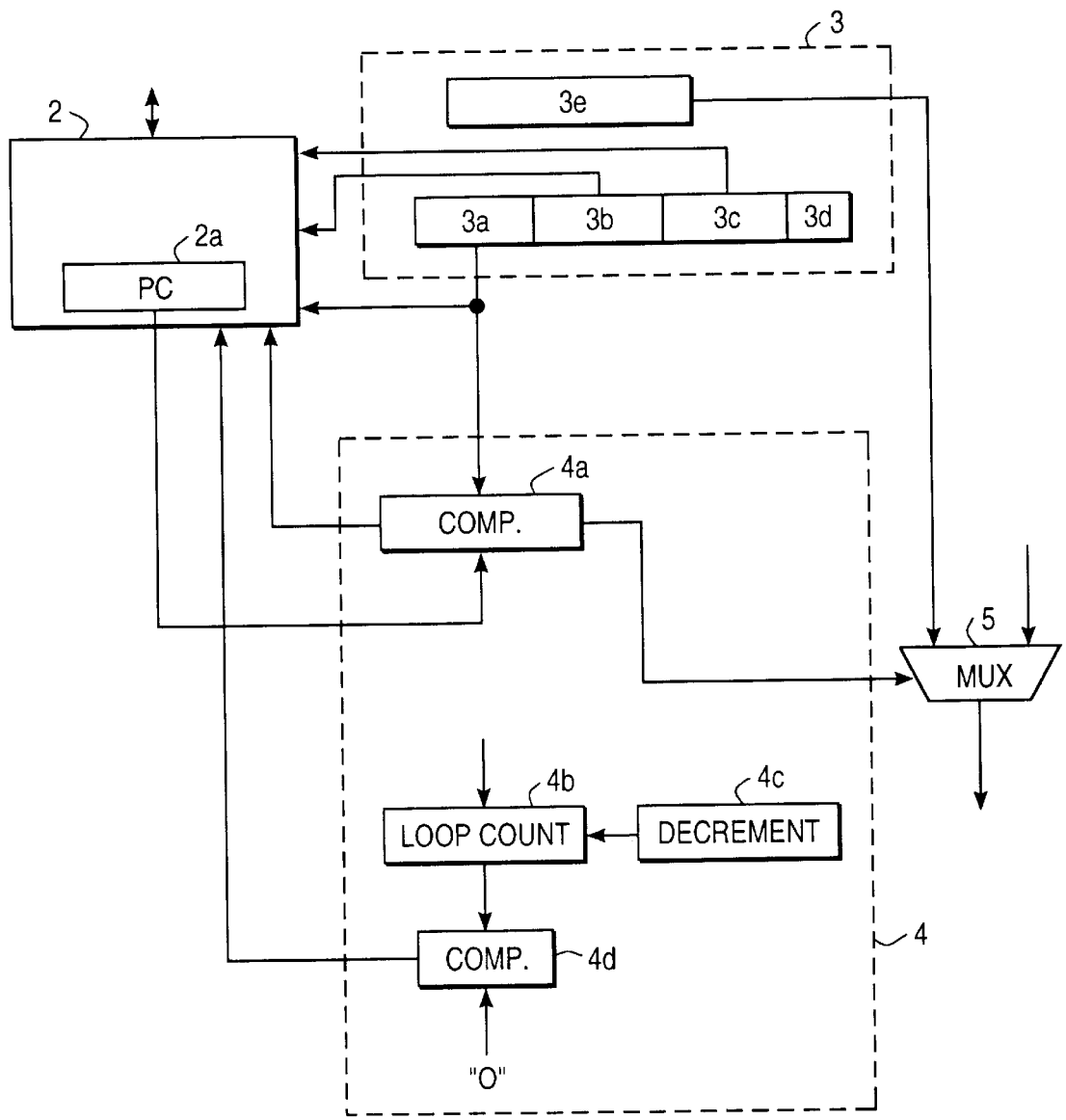

| | | C1 | C2 | C3 | C4 | C5 |
|---|---|---|---|---|---|---|
| INTEGER PIPE | FETCH | A2 | N | - | A1 | A2 |
| | DECODE | A1 | A2 | - | - | A1 |
| | EXECUTE | - | A1 | A2 | - | - |
| | WRITE BACK | - | - | A1 | A2 | - |
| LOAD / STORE PIPE | FETCH | L2 | B | - | L1 | L2 |
| | DECODE | L1 | L2 | B | - | L1 |
| | EXECUTE | - | L1 | L2 | B | - |
| | WRITEBACK | - | - | L1 | L2 | B |
| LOOP PIPE | DECODE | - | - | - | - | - |
| | WRITEBACK | - | - | - | - | - |

FIG_4

| | | C6 | C7 | C8 | C9 | C10 |
|---|---|---|---|---|---|---|
| INTEGER PIPE | FETCH | A1 | A2 | A1 | A2 | ... |
| | DECODE | A2 | A1 | A2 | A1 | ... |
| | EXECUTE | A1 | A2 | A1 | A2 | ... |
| | WRITE BACK | - | A1 | A2 | A1 | ... |
| LOAD / STORE PIPE | FETCH | L1 | L2 | L1 | L2 | ... |
| | DECODE | L2 | L1 | L2 | L1 | ... |
| | EXECUTE | L1 | L2 | L1 | L2 | ... |
| | WRITEBACK | - | L1 | L2 | L1 | ... |
| LOOP PIPE | DECODE | - | B | - | B | ... |
| | WRITEBACK | - | - | B | - | ... |

FIG_5

| | CN | CN+1 | CN+2 |
|---|---|---|---|
| DECODE | - | B | - |
| WRITEBACK | B | - | B |

FIG_6

| | CN | CN+1 | CN+2 |
|---|---|---|---|
| FETCH<br>DECODE<br>EXECUTE<br>WRITE BACK | A1<br>A2<br>A1<br>A2 | -<br>-<br>A2<br>A1 | N<br>-<br>-<br>A2 |
| FETCH<br>DECODE<br>EXECUTE<br>WRITEBACK | L1<br>L2<br>L1<br>L2 | -<br>-<br>L2<br>L1 | -<br>-<br>-<br>- |
| DECODE<br>WRITEBACK | -<br>B | B<br>- | -<br>B |

FIG_6

DATA PROCESSING DEVICE WITH LOOP PIPELINE

BACKGROUND OF THE INVENTION

The present invention relates to a data processing device having a pipeline structure. Pipeline structures are well known, and used in microprocessors and microcontrollers. To work most efficiently, a pipeline is filled up with a sequence of instructions. Once the sequence is interrupted, the pipeline is filled up again. This causes a loss of processing speed for the microprocessor. Such interrupts occur mainly when a jump, branch or loop instruction is executed, because the following instruction is often not the instruction which follows the jump, branch or loop instruction.

Jump and branch instructions generally depend on a condition for its decision whether or not a jump or branch is to be executed. On the other hand, a loop instruction includes a parameter which indicates the number of times the loop is executed and a parameter which indicates the beginning of the loop. In particular, digital signal processors are often using loop instructions. Therefore, loop instructions can have an important influence on the resulting execution speed of a processor or a data processing unit. It is therefore an object of the present invention to provide a data processing device with means to execute loop instructions as fast as possible.

SUMMARY OF THE INVENTION

The present invention provides, in one embodiment, a data processing device which comprises an instruction fetch unit (e.g., comprising an instruction demultiplexer) having at least an input and an output, a pipeline unit for processing data having at least input and output stages, and a loop pipeline unit for processing a loop instruction having at least input and output stages. The input stages of the pipeline units are connected to the output of the instruction providing unit which provides data for all pipeline units. The pipeline units are able to process the provided data independently in parallel. The loop pipeline can be a pipeline with a functionality only directed to the special loop instruction. It therefore does not necessarily need all the operating units of a regular pipeline. The loop pipeline handles the zero overhead loops, such that during the repetition of a loop, no branch or jump instruction and no condition testing are executed in the main pipeline. The loop pipeline is used to fold out the loop instruction from the execution flow allowing a loop instruction to be performed in parallel, for example, with an integer and load/store operation.

In a further embodiment, a loop instruction cache is provided which caches the loop instruction. Thus, no fetch unit in the loop pipeline is necessary. A multiplexer can be provided which supplies either the instruction sequence or the cached loop instruction to the instruction providing unit.

A method of executing a loop comprises the steps of: if a loop instruction occurs for the first time, then the loop instruction is executed in said pipeline unit and thereby the loop related data are stored in a loop target buffer. During execution of the loop, the loop instruction is executed in the loop pipeline and the instructions included in the loop are executed in the pipeline unit in parallel. Thus, during execution of the loop no overhead occurs. In other words, the loop instruction proper never appears in the instruction pipeline unit, because it is issued in parallel with other instructions to the loop pipeline. When a loop instruction is encountered, the loop instruction is fetched and issued to the load store pipeline. However, on subsequent loop iterations the loop instruction is executed in the loop pipeline. Therefore, loops can be executed very fast with zero overhead.

BRIEF DESCRIPTION OF THE DRAWINGS

FIG. 1 shows a functional block diagram of an instruction fetch module according to the present invention, FIG. 2 shows a loop target buffer in more detail, FIG. 3 shows a loop execution unit, the loop cache buffer and the program counter update and control unit in more detail, FIG. 4 depicts a table showing the content of the pipelines during the first iteration of the loop, FIG. 5 depicts a table showing the content of the pipelines during the second and following iterations of the loop, and FIG. 6 depicts a table showing the content of the pipelines during the exit of the loop.

DESCRIPTION OF THE PREFERRED EMBODIMENT

The loop instructions are designed to optimize inner loops in, for example, digital signal processor algorithms, etc. A set of dedicated hardware is associated with the loop instructions. This set of dedicated hardware implements zero overhead loops.

Such hardware can include an instruction fetch module which is an integral part of a preferred embodiment of a microcontroller and schematically shown in FIG. 1. For a better overview, FIG. 1 shows only the main connections between the main units. In the preferred embodiment, this instruction fetch module 1 comprises three pipeline units 10, 11 and 12. However, the microprocessor may have only one main pipeline or the main pipeline may consist of a plurality of pipelines.

The first unit represents the integer pipeline 10 and comprises three stages, namely, a decode stage 10a, an execute stage 10b and a write back stage 10c. However, the present invention is not limited to a certain number of pipeline stages. The second unit represents the load/store pipeline 11 and also comprises three stages, namely, a decode stage 11a, an execute stage 11b and a write back stage 11c. The third unit represents the loop pipeline 12 and comprises two stages, namely, a decode/execute stage 12a and a write back stage 12c.

An instruction demultiplexer 7, representing the instruction providing unit, provides the different pipeline units 10, 11 and 12 with their respective instructions. This instruction demultiplexer 7 is controlled by an issue control unit 9 which is coupled to a pipeline control unit 14. The instruction demultiplexer 7 is coupled to the output of a multiplexer 5 which either forwards an instruction from a cache subsystem 13 or from a loop cache buffer unit 3. The loop cache buffer unit 3 is coupled to a program control update and control unit 2 which is also coupled to the cache subsystem 13. As part of the loop pipeline 12, a loop execution unit 4 is on one hand coupled to the program counter update and control unit 2 and on the other hand to the loop cache buffer 3. The loop cache buffer 3 can also contain a branch target buffer (BTB). The output of the multiplexer 5 is connected to an input of a pre-decoder 6 which has an output which is connected to the instruction demultiplexer 7. Furthermore, the pre-decoder 6 is coupled to the program counter update and control unit 2. A protection register 8 is coupled to the program counter update and control unit 2 and to the three pipelines 10, 11 and 12. Further port connections between the program counter update and control unit 2 and the protection register 8 are shown in FIG. 1.

This unit 1 is responsible for feeding instructions to the different pipelines 10, 11 and 12. The main pipelines 10 and 11 of this embodiment have four stages. The first stage is formed by the instruction demultiplexer 7, the pre-decoder 6 and the logic connecting the pipelines 10, 11 and 12 with the cache subsystem 13. This stage is generally referred to as the fetch stage which issues the instructions to the respective main pipelines 10 and 11. The second stage is depicted by the units 10a and 11a and referred to as the decode stage where the instructions are decoded. The third stage is depicted by units 10b and 11b and referred to as the execute stage where the instructions are executed. In other words, the operation proper is performed by, for example, calculation of an address in a load/store instruction, or performing a multiplication. The fourth stage is depicted by units 10c and 11c and referred to as the write back stage where the results of the respective operation is written back to, for example, the register file or a memory location.

In this specific embodiment, whenever a loop instruction occurs for the first time, it is executed as a normal instruction in the load/store pipeline 11. During decoding in the decode stage 11a, the loop target is calculated, the new program counter is set, and the value for the loop count is loaded from a register of the register file addressed by the loop instruction. During the following execute stage 11b, the loop cache buffer 3 is updated and the new loop count value is written back to the register file. However, in another embodiment, the loop pipeline could be a fully operable pipeline which handles the complete execution of loop instructions in parallel with the other pipelines.

FIG. 2 shows the special register which is part of the loop cache buffer 3. A first portion 3a of the register content represents the previous instruction address. A second portion 3b represents the target instruction address. A third portion 3c represents the loop instruction size and a fourth portion 3d indicates that the entries are valid. Preferably, the size of the address portions 3a and 3b complies with the respective address range or program counter. The loop instruction size portion 3c indicates the word size of the loop instruction. A loop instruction may be, for example, a 16 bit or a 32 bit instruction. Depending on this information, the address of the following instruction will be calculated. In other words, the instruction size value will be added to the current program counter value to get the address of the following instruction in the sequence. In the last pipeline stage 11c, the new value for the loop count is written back into the respective register.

FIG. 3 shows parts of the program counter update and control unit 2, parts of loop target buffer 3, and parts of loop execution unit 4 in more detail. Same elements have the same numerals. The loop target buffer 3 contains the register 3a, 3b, 3c, 3d shown in FIG. 2. In addition, a register 3e is provided which stores the loop instruction detected during the first iteration. Numeral 2a depicts the program counter (PC) of the program counter update and control unit 2. Some parts of the loop execution unit 4 are considered as to be elements of the loop pipe unit 12. These are, for example, a comparator 4d which compares the content of the loop count value register 4b with zero and a decrementer 4c connected to the loop count value register 4b which decrements the loop count value 4b each time the loop has been executed. The comparator 4d generates a signal which is fed to the program counter update and control unit 2. Additionally, an address comparator 4a is provided which compares the previous instruction address 3a of the loop cache buffer 3 with the actual program counter 2a. The address comparator 4a generates a signal which is fed to the program counter update and control unit 2. The program counter update and control unit 2 calculates and/or sets a new program counter depending on the signal of the comparators 4a and 4d. To calculate a new address or to set a new target address, the program counter update and control unit 2 gets the target instruction address from the portion 3b and the instruction size from the portion 3c in the special register of the loop cache buffer 3.

After processing the loop for the first time, the loop cache buffer 3 is set. In other words, the target address is stored in register portion 3b, the previous instruction address is stored in register portion 3a, and the loop instruction size is stored in register portion 3c. Also, register portion 3c which can be a flag, is set to indicate that the entries are valid. In addition, the loop instruction itself is stored in a register 3e which outputs its content to the multiplexer 5. This multiplexer is controlled by the output signal of the comparator 4a.

During the loop execution, unit 4 compares the content of the program counter 2a with the content of the register portion 3a which indicates the previous instruction address. If there is a match then the output signal of comparator 4a sets the following program counter value to the target instruction address stored in register portion 3b and the loop instruction is injected into the loop pipeline 12 from the register 3e in the loop cache buffer 3 through the multiplexer 5. Thus, the loop instruction is not executed in the load/store pipeline 11. The loop pipeline 12 does not need a fetch stage, because the loop instruction is cached in register 3e during the execution of the loop. During the next cycles, the first instruction or the first two instructions of the loop are executed in the integer pipeline 10 and/or the load/store pipeline 11. While this is happening, the loop instruction is executed in parallel in the loop pipeline 12. During the execution stage, the loop count value is fetched from the register of the register file indicated by the loop instruction. The loop value is then decremented by the decrementer 4c and compared to zero by the comparator 4d. During the following cycle (write back), the result of the new loop count value is written back to the respective register in the register file. If the comparator result indicates a match, a signal is sent to the program counter update and control unit 2 to indicate that this is the last time the loop is executed. Also, the flag 3d indicating a valid entry is reset. This also prevents the multiplexer 5 from being controlled further by comparator 4a. Because this happens when some instructions of the loop are already loaded into the pipeline units, it is necessary to replace these instructions loaded into the fetch and decode stages of the pipeline units 10 and 11 with no operation instructions (NOP). Also, if comparator 4a outputs a match signal, a new target address is calculated by adding the value of loop instruction size register portion 3c to the program counter value, and this new address will be stored in the program counter. This causes the fetch stage 10a, 11a of the pipeline units to fetch the respective new target instruction(s).

The execution of a loop in a program will be explained in more detail in accordance to a sample program. The sample program contains the following sequence:

loop_start:

| | | |
|---|---|---|
| add | d0, d0, 1 | ;instruction A1 |
| ld.w | d1, [a0+]4 | ;instruction L1 |
| add | d0, d0, d1 | ;instruction A2 |
| st.w | [a1+]4,d0 | ;instruction L2 |

| | | |
|---|---|---|
| loop | a8, loop_start | ;instruction B |
| add | d4, d4, 2 | ;instruction N |
| ... | | |

This example program contains three different kinds of instructions. The microcontroller of this embodiment is capable of executing up to three instructions in parallel. Two instructions can be issued in parallel with the main pipeline units 10 and 11. The first type, load/store instructions, move data from the register file to the memory/peripherals or vice versa. Also, data can be transferred in between the register file or in between memory/peripherals. The second type, integer instructions, process data in a definable manner, such as calculating, manipulating single bits, calculating conditions, etc. The integer instructions A1, A2 and N from the demonstration program are executed in the integer pipeline unit 10. The load/store instructions L1 and L2 from the demonstration program are executed in the load/store pipeline unit 11. For an optimized program flow, an instruction pair (a load/store instruction and a integer instruction) are always issued to the pipelines 10 and 11 in parallel. In other words, two instructions of the same type never follow each other. The above mentioned demonstration program shows such an arrangement. If two instructions of the same kind have to follow each other, a no operation instruction (NOP) is issued to the respective other pipeline unit. The third pipeline 12 can only execute one type of instruction, namely the loop instruction B. The instruction B is kind of a load/store instruction. Therefore, it is executed either in the load/store pipeline unit 11 or the loop pipeline unit 12.

FIG. 4 shows a table with the first iteration of the loop. The numerals A1, A2, L1, L2, B and N indicate the instructions issued to the pipeline, whereas a "-" indicates a no operation instruction (NOP). On this first iteration of the loop in cycle C1, instructions A1 and L1 are in the decode stages 10b and 11b, and instructions A2 and L2 are in the fetch stages 10a and 11a, respectively. In the following cycle C2, the instructions A1 and L1 are forwarded to the execution stages 10c and 11c and the loop instruction B is issued for the first time to the load/store pipeline stage 11 a and the following instruction N is issued to the fetch stage 10a. In the next cycle C3, the loop instruction B is decoded and a new program counter containing the target loop address (loop_start) is calculated. At the same time, no operation instructions (NOP) replace the decode and fetch stage contents of the integer pipeline and the fetch stage of the load/store pipeline. In the next cycle C4, the new program counter results in an issue of instructions A1 and L1 to the respective fetch stages of the integer and the load/store pipelines 10, 11. During the execution of the loop instruction B, the loop target buffer is updated as described above.

FIG. 5 shows the second and subsequent iterations of the loop. The loop body, consisting of instructions A1, L1, A2, and L2, is executed normally until the instruction or instruction pair prior to the loop is fetched and the address in PC 2 matches the address stored in the register portion 3a of the loop target buffer 3. When this condition is detected, the loop target address is read from register portion 3b of the loop cache buffer 3 and is used as the new address in PC 2. The loop target instructions are fetched on the following cycle and are issued to the decode stage along with the cached loop instruction which is issued to the loop pipeline 12 in cycle C7, C9, etc. The loop is then executed in the decode phase using the comparator 4d and the decrementer 4c. If the loop is taken, then both the integer pipeline 10 and the load/store pipeline 11 will be in the normal state and the first two instructions of the loop will be issued to the execute stage. If the loop is not taken, then the two major pipelines 10 and 11 will be placed into the cancel state and the instruction demultiplexer 7 will be setup to fetch the first instruction after the loop.

FIG. 6 shows this scenario. In cycle CN+1 the decrementer 4c decrements the loop count value and the result is equal to zero. Therefore, comparator 4d generates a signals which causes a cancellation of the fetch and decode contents of the integer and load/store pipeline stages, and a calculation of the new subsequent program counter (PC). In cycle CN+2, this causes the instruction N following the loop to be issued to the integer pipeline 10. The processing of further instructions is not shown in FIG. 6.

In the preferred embodiment and the above example program, the actual program counter is compared to the address of the instruction A2, which represents the last instruction pair before the loop instruction B. Any other address in between the loop can be used for this purpose. For example, the beginning address of the loop (loop_start) could be used for triggering the issue of the loop instruction. Nevertheless, using the instruction address before the loop instruction has the advantage that, when the loop instruction is executed from the register 3e of loop target buffer 3, the loop instruction is injected with the target instruction and is therefore the oldest instruction in the pipeline. Thus, no additional means for handling exception routines are necessary.

What is claimed is:

1. Data processing device comprising: an instruction providing unit having an input and an output; and
    an instruction processing unit being coupled with said output of said instruction providing unit, wherein said instruction processing unit comprises:
        a pipeline unit for processing instructions supplied by said instruction providing unit having input and output stages, wherein said pipeline unit processes a loop instruction on a first occurrence; and
        a loop pipeline unit for processing all following occurrences of said loop instruction supplied by said instruction providing unit having input and output stages; wherein
    said input stages of said pipeline unit and said loop pipeline unit being coupled to said output of said instruction providing unit, said instruction providing unit providing data for said pipelines; and
    said pipeline unit and said loop pipeline unit processing said data independently; and wherein all units are integrated within a single microprocessor.

2. Data processing device according to claim 1 further comprising a loop cache buffer having an input and an output, said output being coupled to said input of said instruction providing unit.

3. Data processing device according to claim 2, wherein said loop cache buffer comprises a register, said register providing storing capacity for a loop instruction address, a loop target instruction and a program counter value following the target instruction.

4. Data processing device according to claim 2, wherein said loop cache buffer comprises a register, said register providing storing capacity for a previous instruction address and a target instruction address.

5. Data processing device according to claim 4, wherein said register in addition provides storing capacity for an instruction size value.

6. Data processing device according to claim 2 further comprising an instruction multiplexer with two inputs and an output, one of said inputs being fed with a instruction sequence, said output being connected to said instruction providing unit, said loop cache buffer comprises at least a register, said register providing storing capacity for at least a loop instruction, said register being coupled to the other input.

7. Data processing device according to claim 2 further comprising a branch target buffer having an input and an output, said output being connected to said input of said instruction providing unit.

8. Data processing device according to claim 7, wherein said branch target buffer comprises a register, said register providing storing capacity for a program counter data and a predicted program counter data.

9. Data processing device according to claim 1 further comprising a second pipeline unit for loading and storing data having input and output stages, said input stage of said second pipeline unit is connected to said output of said instruction providing unit.

10. Data processing device according to claim 1, wherein said loop pipeline unit comprises storing means for storing a loop counter value and means for comparing and decrementing said loop counter value.

11. A method for executing a loop instruction which is part of a instruction stream in a microprocessor for processing instructions, said microprocessor having an instruction providing unit with an input and an output, a first pipeline unit for processing data with input and output stages, a second pipeline unit for processing a loop instruction with input and output stages, said input stages of said pipeline units are connected to said output of said instruction providing unit, said instruction providing unit providing instructions for said pipelines; the method comprises the step of: predecoding said instruction stream and providing said first pipeline with the respective instructions, wherein said loop instruction is issued to said first pipeline on its first occurrence and extracting said loop instruction out of the instruction stream on all following occurrences and issuing said loop instruction to said second pipeline unit, said loop instruction being executed in parallel with said other instructions of said instruction stream.

12. Method according to claim 11, wherein said first pipeline comprises two independent pipeline units, the method comprises the step of: pre-decoding said instruction stream, and if possible distributing instructions in parallel to said independent pipeline units of said first pipeline, and if not possible distributing one instruction to one pipeline unit and a no operation instruction to the other pipeline unit.

13. Method according to claim 11, wherein the method further comprises the steps of:
caching said loop instruction in a cache register, and
issuing said loop instruction from said cache register to said second pipeline.

14. A method for executing a loop instruction including a loop target address and a loop counter value in a microprocessor for processing instructions having a program counter, an instruction providing unit with an input and an output, a loop target buffer being connected to said instruction providing unit, a pipeline unit for processing data with input and output stages, a loop pipeline unit for processing a loop instruction with input and output stages, said input stages of said pipeline units are connected to said output of said instruction providing unit, said instruction providing unit providing instructions for said pipelines; the method comprises the step of: if a loop instruction occurs for the first time, executing said loop instruction in said pipeline unit and thereby storing loop related data in said loop target buffer; wherein after the execution of said loop instruction during execution of said loop, said loop instructions are processed in said loop pipeline.

15. Method according to claim 14, wherein said loop instruction is issued to the loop pipeline at the beginning of each loop.

16. Method according to claim 14, wherein said loop instruction is issued to the loop pipeline at the end of each loop.

17. Method according to claim 14, wherein said loop related data include a loop instruction address, said loop target address and a program counter value following the target instruction.

18. Method according to claim 17, wherein said loop related data include further said loop instruction.

19. Method according to claim 14, wherein said loop related data include a previous instruction address and a target instruction address.

20. Method according to claim 19, wherein said loop related data include further said loop instruction.

21. Method according to claim 14, wherein the loop instruction is decoded and executed in a first stage and written back in a second stage.

22. Method according to claim 21, wherein in said first stage, the loop counter value is decremented and compared to zero.

23. Method according to claim 22, wherein in the second stage, said counter value is written back.

* * * * *